E. P. Russell,
Mower.
No. 47,338.     Patented Apr. 18, 1865.
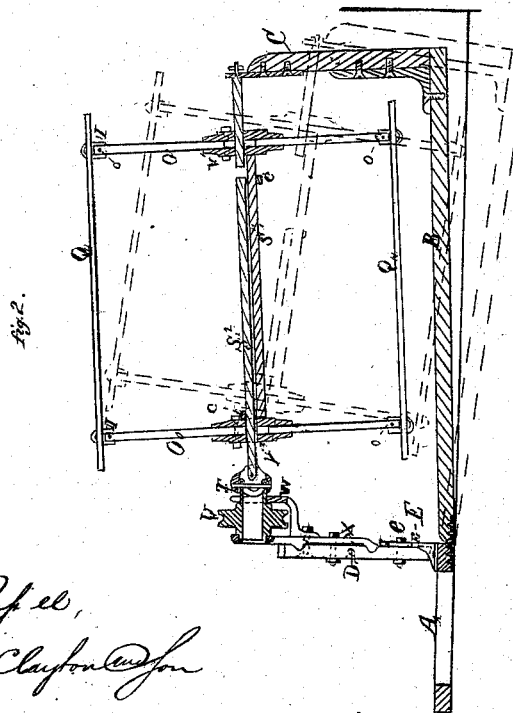
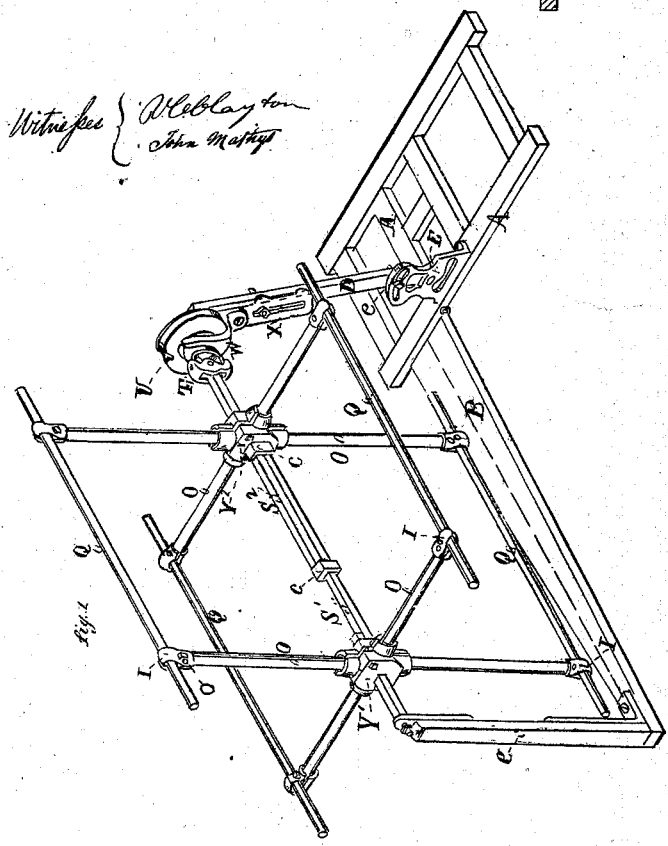

UNITED STATES PATENT OFFICE.

E. P. RUSSELL, OF MANLIUS, NEW YORK.

IMPROVEMENT IN REELS FOR HARVESTERS.

Specification forming part of Letters Patent No. 47,338, dated April 18, 1865.

*To all whom it may concern:*

Be it known that I, E. P. RUSSELL, of Manlius, in Onondaga county, in the State of New York, have invented certain new and useful Improvements in Flexible Reels for Harvesters; and I do hereby declare that the following is a full, clear, and exact description thereof, reference being had to the accompanying drawings, and to letters of reference thereon marked.

In the drawings, Figure 1 is a general view in perspective, the reel and cutter-bar being shown in the horizontal position, as they appear when passing over level ground. Fig. 2 is a longitudinal vertical section, showing the reel and cutter-bar depressed, as they appear when the end of the cutter-bar is downhill, the red lines showing the reel and cutter-bar thrown up above the horizontal line, as they appear when the end of the cutter-bar is uphill.

To enable others to make and use my invention, I will describe its construction and operation.

The nature of my invention consists in making the shaft of a reel for harvesters and mowing-machines in two pieces, overlapping and sliding past each other through square clamps on their inner ends, one of the pieces passing through and being fast to the "spider" on the outer end of the reel, and the other one passing and sliding freely through the spider on the inner end of the reel, for the purpose of allowing the reel-shaft to expand or contract, so that the reel and the cutter-bar may maintain their relative positions upon ground of varying equality, as will fully hereinafter appear.

In the drawings, A represents the frame of the harvester; B, the cutter-bar. C is a temporary support used in lieu of the outer support of the reel, which in an actual machine extends forward from the rear of the machine. D is the standard, rising from the frame A for the purpose of supporting the inner end of the reel, and is provided with a quadrant clamp, E, and set-screw $d$, so as to be set at various angles. $S'$ and $S^2$ are the two parts of my reel-shaft, their inner ends being provided with sliding clamps $c$ $c$, so that each part S slides through the clamp $c$ of the other part S. The inner end of the shaft is connected with the universal joint T, which is made to and partially out of the driving-pulley U. $V'$ $V^2$ are spiders or clamps which compress and hold together the arms which compose the ends of the reel. The spider $V'$ is fastened by a set-screw to the shaft $S'$, while the spider $V^2$ slides loosely over the shaft $S^2$. U is the driving-pulley, the shaft of which is cut away, as shown in the drawings, so as to form a part of the universal joint T. W is the forked journal-box in which the shaft of the pulley U revolves, and it has an arm, X, projecting downward, which is provided with a slot and set-screw, so that the reel may be raised or lowered, according to the height of the grain to be cut.

I have described my improved reel as having two clasps, $c$, some distance apart from each other. I find that this arrangement gives greater steadiness than any other mode of operating the double shaft that I have tried. Instead of using two clasps, I may use only one, and that may be of considerable length; or one part of the shaft might be made to slide into the other part, which might be made hollow for that purpose.

The operation of my invention is exceedingly simple and satisfactory. As the wheel on the outer end of the cutter-bar B rises or falls in following the unevenness of the ground the shaft contracts or expands, one part of the shaft sliding past the other, and the part $S^2$ of the shaft sliding through its end of the reel-frame, so that the reel and the cutter-bar may maintain their relative positions. To illustrate, the cutter-bar and reel-shaft form the longer sides of a rectangular parallelogram when the machine runs on level ground, and the supporters C and D form the shorter sides. Now, when the cutter-bar is raised by passing over a hill, the angle made by the hinged end of the cutter-bar and the standard D is changed to an acute angle, thus making the distance between the tops of the standards less than the length of the cutter-bar; hence the necessity of the contracting reel-shaft. I I are metallic clasps cast each in two pieces, and so shaped as that one end of them may, when placed together, have a circular grasp, adapted to clasp the ends of the arms O of the reel, which are made of cylindrical rods, the outer ends of the clasps having a circular grasp to clasp the beaters Q, which are thus secured to and at right angles with the arms of the reel. A bolt and nut, o, passes through the clasp and arms and secures the beaters and arms firmly together, as desired.

Having thus fully described my invention, what I claim as new, and desire to secure by Letters Patent, is—

1. Constructing the shafts of harvester-reels in two pieces, $S'$ $S^2$, or their equivalents, operating substantially in the manner and for the purposes specified.

2. The clamps I, constructed, applied, and operating substantially as and for the purposes herein specified.

E. P. RUSSELL.

Witnesses:
Jo C. Clayton,
V. C. Clayton.